United States Patent
Achar et al.

(10) Patent No.: US 9,875,261 B2
(45) Date of Patent: Jan. 23, 2018

(54) DATA LOGS MANAGEMENT IN A MULTI-CLIENT ARCHITECTURE

(71) Applicant: Alcatel Lucent, Boulogne Billancourt (FR)

(72) Inventors: Anitha Achar, Bangalore (IN); Brijesh Unnikrishnan, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 279 days.

(21) Appl. No.: 14/432,595

(22) PCT Filed: Sep. 17, 2013

(86) PCT No.: PCT/EP2013/069277
§ 371 (c)(1),
(2) Date: Mar. 31, 2015

(87) PCT Pub. No.: WO2014/053313
PCT Pub. Date: Apr. 10, 2014

(65) Prior Publication Data
US 2015/0254285 A1 Sep. 10, 2015

(30) Foreign Application Priority Data
Oct. 4, 2012 (IN) .......................... 3109/DEL/2012

(51) Int. Cl.
*G06F 17/30* (2006.01)
(52) U.S. Cl.
CPC .. *G06F 17/30303* (2013.01); *G06F 17/30584* (2013.01)

(58) Field of Classification Search
CPC .................. G06F 17/30082; G06F 17/30303
See application file for complete search history.

(56) References Cited

U.S. PATENT DOCUMENTS

| 7,783,666 B1 | 8/2010 | Zhuge et al. |
| 2007/0174246 A1 | 7/2007 | Sigurdsson et al. |

(Continued)

FOREIGN PATENT DOCUMENTS

| CN | 102270225 A | 12/2011 |
| CN | 102411533 A | 4/2012 |

(Continued)

OTHER PUBLICATIONS

International Search Report for PCT/EP2013/069277 dated Dec. 18, 2013.

*Primary Examiner* — Mohammad S Rostami
(74) *Attorney, Agent, or Firm* — Fay Sharpe, LLP

(57) ABSTRACT

Systems and methods for data logs management in a multi-client architecture are described. According to the present subject matter, the system(s) implement the described method(s) for efficient data logs management. The method includes identifying purging parameters associated with each entity of the plurality of entities, where the purging parameters signify a mechanism of purging data logs stored in partition corresponding the entity, and where the purging parameters comprises at least criticality point associated with data logs to relinquish storage space. Further, the method includes purging of data logs stored in the partition of the entity based on the purging parameters, wherein the purging relinquishes the storage space.

14 Claims, 2 Drawing Sheets

(56) References Cited

U.S. PATENT DOCUMENTS

| | | | |
|---|---|---|---|
| 2009/0106425 A1* | 4/2009 | Zuckerman | G06F 17/30206 709/226 |
| 2009/0248697 A1* | 10/2009 | Richardson | G06F 12/0813 |
| 2009/0276470 A1 | 11/2009 | Vijayarajan et al. | |
| 2011/0022812 A1* | 1/2011 | van der Linden | G06F 9/5077 711/163 |
| 2012/0089716 A1 | 4/2012 | Katz | |

FOREIGN PATENT DOCUMENTS

| | | |
|---|---|---|
| JP | H04149749 A | 5/1992 |
| JP | H0869395 A | 3/1996 |
| JP | H08147194 A | 6/1996 |
| JP | 2003015912 A | 1/2003 |
| JP | 2004-038312 A | 2/2004 |
| JP | 2004038313 A | 2/2004 |
| JP | 2006041764 A | 2/2006 |
| JP | 2007199956 A | 8/2007 |
| JP | 2007241540 A | 9/2007 |
| JP | 2008041041 A | 2/2008 |
| JP | 2010218313 A | 9/2010 |
| JP | 2010244137 A | 10/2010 |
| WO | 2012025994 A1 | 3/2012 |

\* cited by examiner

DATA LOGS MANAGEMENT IN A MULTI-CLIENT ARCHITECTURE

FIELD OF INVENTION

The present subject matter relates to computing systems and, particularly, but not exclusively, to storage of data logs on the computing systems.

BACKGROUND

During an execution or running of an application, a multitude of events may take place. For example, the application may execute multiple steps many times. The application may run loops in multiple iterations. It may make and close numerous connections. Threads may be initiated and completed. An event may trigger other events, which may trigger still other events. Similarly, for the purpose of execution, multiple entities or hardware components of a system may communicate with each other and exchange data. Such data may either be delivered accurately or might be dropped or get corrupted during the exchange. Therefore, during the exchange of data, or execution of the application, multiple events occur in real time which are either successful, unsuccessful, or incomplete.

In situations where the events are plenteous and occur in real time, it is not always physically possible to monitor the state of such events for the purpose of accuracy, troubleshooting, and timely completion of the events. Further, to refer to any previously completed event, mere reliance on recollection of occurrence of the event to gather the facts of the event along with the result is a cumbersome and difficult task. Furthermore, in certain situations it is difficult to reproduce the events occurred in the given environment. Therefore, generally the details related to different events, occurring at different time instances, are accounted and stored as data logs. Such data logs include a historical record of events that have occurred or are occurring during any given process.

In present day scenarios where execution of applications and processes involve plentiful events, physical track keeping of all the events is not possible and moreover, physical maintenance of data logs for such events is also not feasible. Hence, the data logs associated with events are generally recorded electronically and stored in a memory component for future purposes. The data logs can be used for various purposes, such as for troubleshooting purposes where a user may benefit from reviewing the logged events. Similarly, a user may further benefit from viewing information about any of the events that occurred during the event execution and may be aided in diagnosing problems or answering questions related to results of the execution. Moreover, routine data log analysis is beneficial for identifying security incidents, policy violations, fraudulent activity, and operational problems. Also, data logs are useful at the time of auditing, forensic analysis, supporting internal investigations, establishing baselines, and identifying operational trends and long-term problems.

SUMMARY

This summary is provided to introduce concepts related to management of data logs in a multi-client architecture, in accordance to an implementation of the present subject matter. This summary is not intended to identify essential features of the claimed subject matter nor is it intended for use in determining or limiting the scope of the claimed subject matter.

In one implementation, a method for data logs management is described. The method includes identifying purging parameters associated with each entity of the plurality of entities, where the purging parameters signify a mechanism of purging data logs stored in partition corresponding the entity, and where the purging parameters comprises at least criticality point as a criteria of purging the data logs to relinquish storage space. Further, the method includes purging of data logs stored in the partition of the entity based on the purging parameters.

In another implementation, the method further includes identifying fragmentation parameters associated with each entity from amongst the plurality of entities, where the fragmentation parameters define the fragmentation criteria of data logs into different sizes; and fragmenting the data logs generated by each of the entity from amongst the plurality of entities to different sizes based on the identified fragmentation parameters, wherein the fragmentation allows optimized utilization of the storage space.

Further, the method also includes identifying overwriting factors associated with each entity from amongst the plurality of entities, where the overwriting factors define overwriting criteria of data logs from one partition to another; and overwriting data logs of the entity onto partition of another entity based on the overwriting factors, wherein the partition of another entity is unused.

In one implementation, a system for data logs management in a multi-client architecture is described. The system includes a purging module coupled to a processor, configured to identify purging parameters associated with each entity of the plurality of entities, where the purging parameters signify a mechanism of purging data logs stored in partition corresponding the entity and, the purging parameters comprises at least criticality point of associated with data logs. The purging module is further configured to purge data logs stored in the partition of the entity based on the purging parameters, where the purging relinquishes the storage space.

In another implementation, a non-transitory computer-readable medium having embodied thereon a computer readable program code for executing a method is described. The method includes identifying purging parameters associated with each entity of the plurality of entities, where the purging parameters signify a mechanism of purging data logs stored in partition corresponding the entity, and where the purging parameters comprises at least criticality point as a criteria of purging the data logs to relinquish storage space. Further, the method includes purging of data logs stored in the partition of the entity based on the purging parameters.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
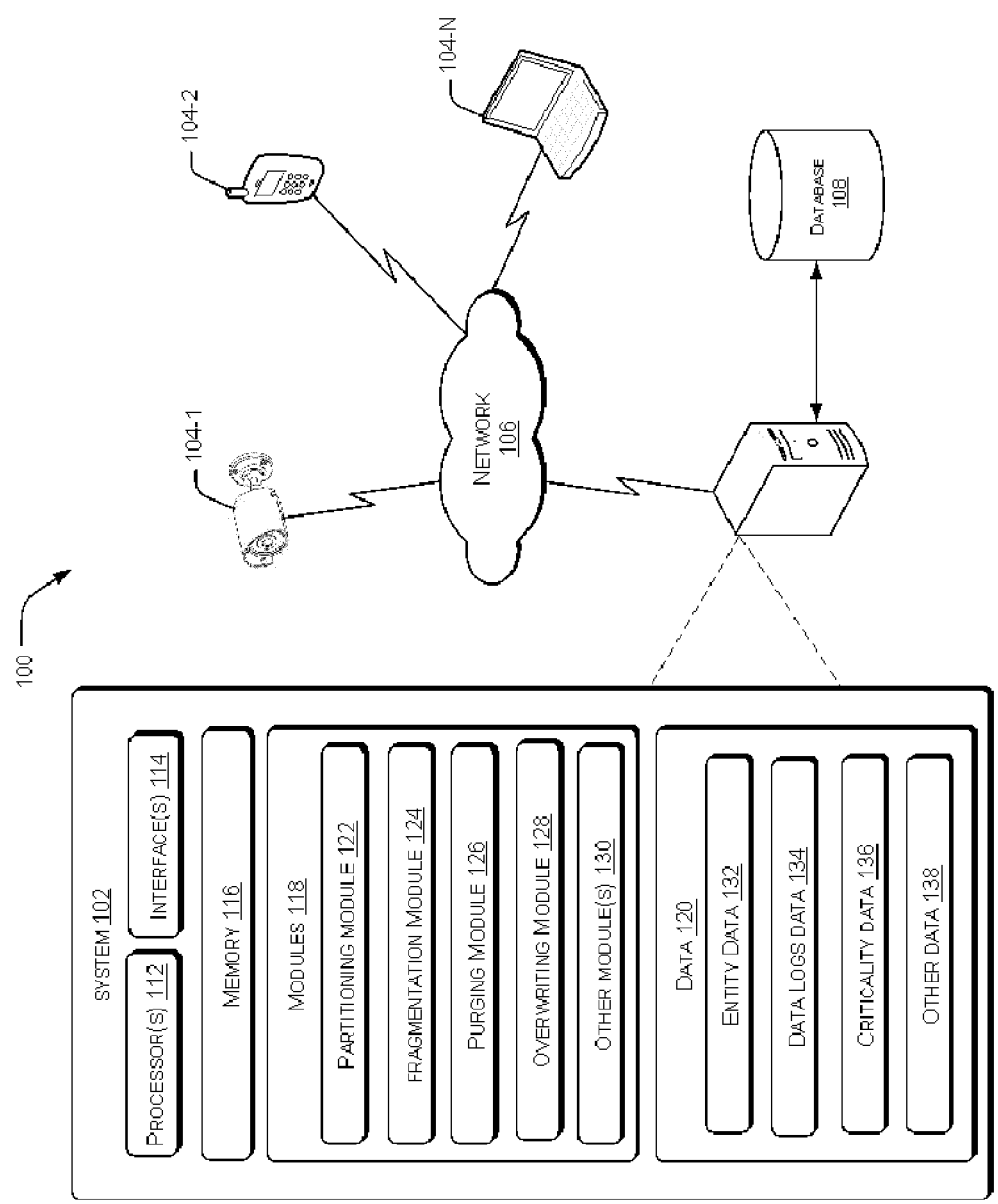
FIG. 1 illustrates an exemplary network environment, implementing a data logs management system (DLMS), according to an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

Systems and methods for data logs management in a multi-client architecture to allow efficient storage of data logs are described. The methods can be implemented in various computing devices communicating through various networks. Although the description herein is with reference to systems of a communication network, the methods and systems may be implemented in other systems capable of storing data logs, albeit with a few variations, as will be understood by a person skilled in the art.

Data logs are generally stored in memory components of a system to preserve the details related to different events, occurring at different time instances. Such data logs include a historical record of events that have occurred. In an organization, data logs can be generated by many sources and multiple events including security softwares, such as antivirus software, firewalls, and intrusion detection and prevention systems; operating systems on servers, workstations, and networking equipment; and applications. Since the data logs for each of the source are stored and maintained for future use, the number, volume, and variety of data logs managed by the organization are profuse.

The data logs generated by different sources for different events are either stored for transmitting, analyzing, and processing, or disposed for destruction. Due to limited storage space at the servers storing the data logs, the data logs are also periodically destroyed for renewing memory for storage of the new data logs. For example, an organization may utilize 100 GB of space on its server for storage of logs generated from day to day operation of different applications and processing of various processes. If all the various events of the organization generate nearly 2 GB of data logs daily, at instances, it is possible that the server may only be left with data storage space of less than 2 GB, such as the utilized space is 99 GB. In such situations, to effectively store all the data logs generated on a subsequent day, the server may have to destroy some of the previously stored or unnecessary data logs such that the free space available is now greater than 2 GB.

To manage the extremely high amount of generated data logs and to relinquishing the storage space by destroying previously stored or unnecessary data logs, the server handling the data logs presently utilize techniques of data log management, also known as log management techniques.

The conventionally utilized data log management techniques manage the storage, processing, transmitting, and purging of the data logs based on varying requirements of different business processes from time to time. Particularly, to purge data logs and relinquish storage space, the log management techniques delete the data logs based on storage date, i.e., the data logs stored earlier are deleted first to make storage space for the new data logs to be stored. Such purging techniques, are similar to the technique of First-in-First-Out (FIFO) where the data stored earlier in time is released before the data that has been stored at a later time instance. Although such purging techniques allow the relinquishment of storage space, however does not consider any importance of criticality associated with the data logs prior to purging. This may often lead to destruction of critical data logs that might be useful for future use over some non critical data logs that might still be stored in the storage space.

Further, as described earlier, different applications and sources may generate data logs to be stored on one storage space. While storing the data logs from multiple sources, the data logs of one particular application may be more critical than the data logs of another. However, while managing logs from different sources and various applications, the FIFO approach weighs all the applications in same way, thereby disallowing providence of any particular priority to data logs of a specific application or, any specific storage capacity to the application.

According to an implementation of the present subject matter, methods of data log management to prioritize storage of important and critical data logs is described herein. The described methods on one hand allow efficient storage of data logs from different applications, on the other; provide efficient purging mechanisms to create free storage space for new data logs. According to the described implementations of the present subject matter, the data logs may be received from different applications, such as security softwares, including antivirus software, firewalls, and intrusion detection and prevention systems; operating systems on servers, workstations, and networking equipment. Further, the data logs may relate to call logs, security logs, networking logs, and communication logs. Although the description is described with respect to communication logs, the described techniques can be implemented in other type of data logs as well, albeit a few variations, as will be understood by a person skilled in the art.

Further, the data logs may be received through different servers and users handling/utilizing different functionalities, such as mail servers, central directory servers, database servers, file servers, print servers, web servers, application servers, notebooks, tablets, network access adaptors.

In one implementation of the present subject matter, the storage space for data logs is divided into multiple partitions where each partition is dedicated for storage of data logs of an entity including either an application, or individual users. Each entity may also be formed by a combination of applications or users clubbed together for the purpose of storage of data logs. In said implementation, each partition when utilized for one particular entity, such as a user or an application, is provided with a pre-defined storage space that can be used for the storage of data logs of that particular entity. For example, if three applications store their data logs at one common server in an organization, the storage space of this server may be partitioned into three partitions, according to the said implementation of the present subject matter. The division of the storage space into different partitions may allow the management of the storage space based on various entities such that different data logs management techniques can be implemented individually on each partition.

In one implementation of the present subject matter, the partitioning of the storage space may be based on the requirement of different applications, such as the entire storage space may be partitioned unequally and different applications may utilize different amount of storage space for data logs. For example, among the three applications, 30% of the entire storage space may be provided to the first application, 60% of the space may be provided to the second application, and finally, the remaining 10% may be allocated to the thirds application based on their specific requirements. The specific requirements specific to each application may be determined by a data logs management system which may be configured to partition the storage space based on the determined requirements.

Further, based on the partition of the available storage space, the data log management technique for each entity, such as the three applications in the described scenario can be different and be based on the requirement of each application. In other words, based on the priority and importance of data logs in each partition, the data logs management, such as purging techniques, storage techniques for different partitions can be varied to suite the business requirements. For example, in the above described situation of data logs of three different applications being stored at three different data partitions, it may be such that one application stores critical data during one particular time period of a day as compared to other time instances. In such a situation, the data partition storing the data logs of this particular application may be implemented with techniques such that sufficient storage space is available at the required particular time period. It would be understood that in such situations the techniques of data log management for the other two applications might be different from the first application.

Similarly, as described above that the data logs purging can be different for different applications based on their specific requirements. In one implementation of the present subject matter, the data logs stored in each of the partition can themselves be fragmented to a smaller size to increase the probability of storing maximum data logs in the partitions of each application. For example, in scenarios where an application generates data logs of size 70 MB and the total space available with the partition allocated to the application is of 550 MB, the maximum data that can be filled by storage of the data logs would be 490 MB and the remaining space of 60 MB would always be unutilized. Hence, in such scenarios, the fragmentation of the data logs into smaller size data logs, the partitions can be utilized efficiently. In the present example, a data log of 70 MB may be fragmented to 60 MB and 10 MB such that the fragment of data log of size 60 MB can be accommodated in the unutilized portion of the partition's storage. The fragmentation enables complete utilization of the storage. Further, fragmentation of data logs also allows efficient processing, thereby avoiding any performance impacts due to processing of larger data logs.

Moreover, in said implementation, the data logs can be fragmented based on the requirement of specific applications and therefore, can be implemented in different forms for different applications. That is, it may be determined that for one application, the fragmentation should be done to a size of 10 MB per data log for efficient utilization of space. However, for another application, the fragmentation may be limited to 8 MB for efficient storage space utilization. Further, although it has been described that the fragmentation can be implemented in different partitions, it would be understood by those skilled in the art that the fragmentation of data logs can also be performed in situations where the storage space is not partitioned among different entities and the data logs of various applications and users is stored collectively.

In another implementation, the data log management for different applications can be varied by way of utilizing different technique of data log purging. For instance, in the above mentioned scenario, to ensure that storage space is available for storage of data logs for the first application at a particular time period, method of purging data logs may be modified for the particular data partition such that, the data log purging occurs prior to the particular time period as compared to normal purging at any other time periods. In other words, the purging instance or the time at which purging occurs for the storage space may be modified to suit the requirement of the data log storage.

Therefore, based on the partitioning of the storage space and allocation of the partitioned space to different entities, different data log management techniques can be implemented for different entities based on their individual specific requirements. It would be understood that the specific requirements of each entity can be user defined to implement data log management techniques.

Similarly, in another implementation of the present subject matter, the unused storage space of the data partition allocated to other applications may also be utilized by any specific application for the purpose of storage of critical data logs in situations of exhaustion of the allocated storage space. For example, among the three applications described earlier, if critical data logs are being saved by the second application and the allocated storage space to the second application is exhausted, the unused storage space allocated to the other two applications may be utilized for the storage of such critical data logs by the first application.

According to an implementation of the present subject matter, the storage of data logs onto partitions allocated to other applications and entities is based on overwriting factors associated with each partition. The overwriting factor may include parameters, such as storage space available, criticality of the data logs, and sharing capability of the partition based on which the partition of each entity may be shared among the different entities. The implementation and use of such parameters in different scenarios has been explained in greater detail with respect to specific embodiments of the accompanied figures.

According to another implementation of the present subject matter, the partitioning of storage space may also be dynamically modified based on available storage space such that the allocated size of the partitioned storage space is changed based on the modified requirements of the entities from time to time. For example, in situations where the total available space is 30 GB and the partitioning of storage space among the applications is based on 30%, 20%, and 50% criteria. However, in situations if the requirement of the third applications rises beyond that of 50% and the storage space is available with the first two applications, the partitioning may be dynamically modified to 20%, 10%, and 70% to provide more storage space to the third application. In one implementation, the data logs management system may be configured to re assess the available space and may dynamically perform the re-portioning based on the requirements.

Based on the dynamic allocation of storage space, the changing requirements of different entities can be considered for effective data logs management. In another implementation of the present subject matter, the purging mechanisms for the partitions are based on the choice of the entity associated with the partition. That is, for entities storing data logs to their allocated partitions, purging mechanisms can be customized as per the requirement of the entities based on different factors. In one implementation, the entities may purge the data based on the duration during which the data logs have been stored.

It would be understood by those skilled in the art that the data logs are stored at different instances and for different purposes. Certain data logs are stored after every predetermined time period to log the state of the working systems. Other data logs are error logs which are generated when there is any particular error in the functioning of either the application, or the systems being monitored. Generally, the error data logs are generated within a short burst time period due to sudden occurrence of the error due to an un-usual event or failure of certain processes. Such error data logs are important at later time instances for troubleshooting of the error, and for understanding the error in greater details. And hence, it would also be appreciated that error data logs are of more critical importance than the normal data logs.

According to an implementation of the presentation subject matter, data logs that are stored in a short burst time period, or with an impulse, or the time duration when maximum data logs are stored, are maintained and not purged for longer durations while the other data logs are purged for earlier, thereby relinquishing storage space. The data logs that are not stored during short bursts and are likely to be normal data logs can be purged with less destruction of critical data, such as the error data logs. It would further be appreciated that the time of purging and the frequency of purging can be varied as per the choice of the entities for efficient and proper data log management.

In yet another implementation of the present subject matter, the data logs are purged based on a criticality point associated with each data log. For example, the data logs that are extremely important and critical, such as the error data logs may be associated with the highest criticality point and; the data logs which are not very important, such as the normal data logs may be associated with lowest criticality point. Based on the criticality point of each data log, according to said implementation, the purging of the data logs may be done. For example, each entity may define the data logs to be purged first based on the criticality point associated with the data logs. One entity may define to purge the data logs with the lowest criticality point first as compared to purging of the other data logs. Similarly, other entities may choose the purging of data logs with highest criticality point first.

Therefore, based on the criticality point associated with different data logs, the purging mechanism may be chosen and applied for relinquishing storage space. This may allow different entities to define purging of different type of data logs at different time instances and with different priorities.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 2:
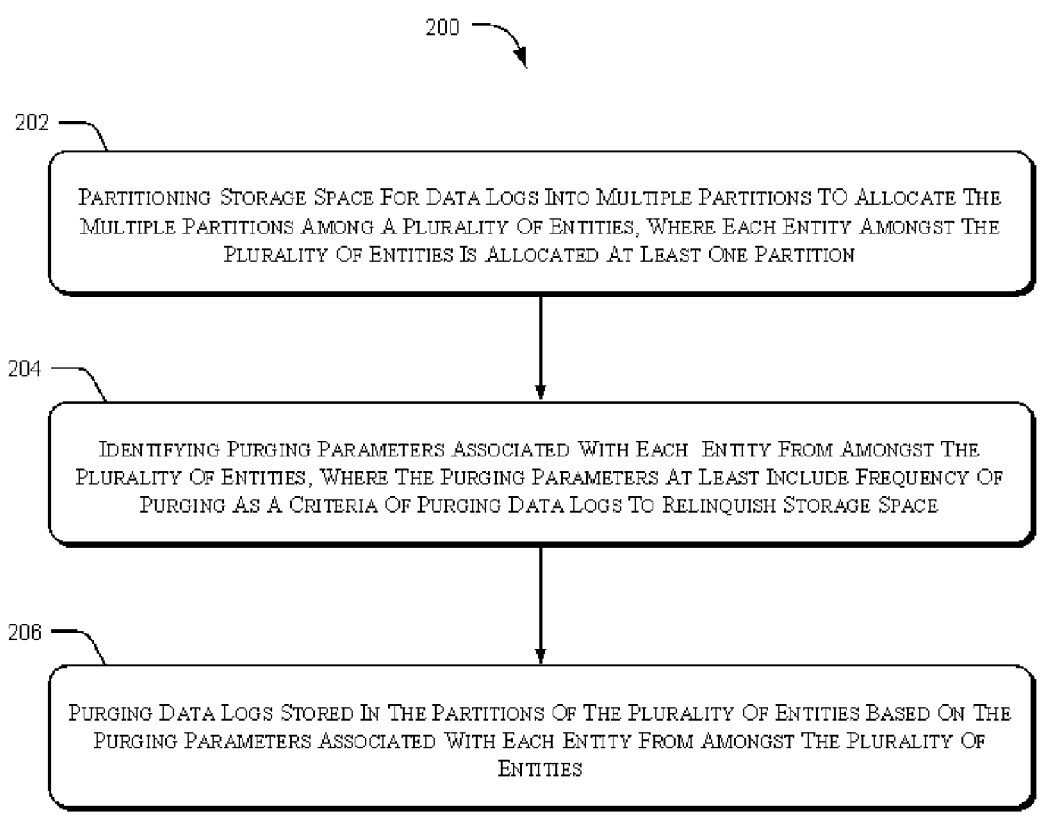
FIG. 2 illustrates a method to implement data logs management, in accordance with an embodiment of the present subject matter In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The manner in which the systems and methods of providing virtual distribution lists shall be implemented has been explained in details with respect to the FIGS. 1 and 2. While aspects of described systems and methods for providing virtual distribution list can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

FIG. 1 illustrates a network environment 100, implementing a data logs management system (DLMS) 102, for implementing data logs, in accordance with an embodiment of the present subject matter. For the sake of explanation, the DLMS is referred to as a system 102 hereinafter. The system 102 described herein, can be implemented in any network environment comprising a variety of network devices, including routers, bridges, servers, computing devices, storage devices, etc. In one implementation the system 102 is connected to one or more client devices 104-1, 104-2, 104-3, . . . , 104-N, individually and commonly referred to as client device(s) 104 hereinafter, through a network 106. The client devices 104 may include multiple applications that may be running to perform several functions, as required by different users and individual organizations. Further, the client devices 104 may also be internal components of any network element, such as 3G network where the client devices 104 are internal components of a BTS, such as a controller, a modem board, and a radio board.

The system 102 can be implemented as a variety of servers and communication devices. The servers and computing systems that can implement the described method(s) include, but are not limited to, mail server, central directory servers, database server, file server, print server, web server, application server, and the like. The system 102 may also be implemented as a computing device, such as a laptop computer, a desktop computer, a notebook, a workstation, a mainframe computer, a server, and the like. The system 102 described herein, can also be implemented in any network environment comprising a variety of network devices, including routers, bridges, servers, computing devices, storage devices, etc.

The client devices 104 may be implemented as, but are not limited to, desktop computers, hand-held devices, laptops or other portable computers, tablet computers, mobile phones, PDAs, Smartphones, security instruments, surveillance equipments, and the like. Further, the client devices 104 may include devices capable of exchanging data to provide connectivity to different communicating devices and computing systems. Such devices may include, but are not limited to, data cards, mobile adapters, wireless (WiFi™) adapters, routers, a wireless modem, a wireless communication device, a cordless phone, a wireless local loop (WLL) station, and the like. As client devices 104 may be stationary or mobile, they may also be understood to be a mobile station, a terminal, an access terminal, a subscriber unit, a station, etc.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as gateways, routers; however, such details have been omitted for ease of understanding.

In one embodiment, the system 102 is associated with a database 108, which stores data logs received from the client devices 104 from different geographic regions. Although the database 108 is illustrated external to the system 102, it will be understood that the database 108 may be internal to the system 102 as well. Further, the database 108 can be implemented as, for example, a single repository, a distributed repository or a collection of distributed repositories.

In one implementation, the system 102 includes processor(s) 112. The processor 112 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Also, the system 102 includes interface(s) 114. The interfaces 114 may include a variety of software and hardware interfaces that allow the system 102 to interact with the entities of the network 106, or with each other. The interfaces 114 may facilitate multiple communications within a wide variety of networks and protocol types, including wire networks, for example, LAN, cable, etc., and wireless networks, for example, WLAN, cellular, satellite-based network, etc.

In another embodiment of the present subject matter, the system 102 may also include a memory 116. The memory 116 may be coupled to the processor 112. The memory 116 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system 102 may include module(s) 118 and data 120. The modules 118 and data 120 may be coupled to the processors 112. The modules 118, amongst other things, include routines, programs, objects, components, data structures, etc., which perform particular tasks or implement particular abstract data types. The modules 118 may also be implemented as, signal processor(s), state machine(s), logic circuitries, and/or any other device or component that manipulate signals based on operational instructions.

Further, the modules 118 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 118 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an implementation, the module(s) 118 includes a partitioning module 122, a fragmentation module 124, a purging module 126, an overwriting module and other module(s) 130. The other module(s) 130 may include programs or coded instructions that supplement applications or functions performed by the system 102. In said implementation, the data 120 includes an entity data 132, data logs data 134, criticality data 136, and other data 138. The other data 138 amongst other things, may serve as a repository for storing data that is processed, received, or generated as a result of the execution of one or more modules in the module(s) 118. Although the data 120 is shown internal to the system 102, it may be understood that the data 120 can reside in an external repository (not shown in the figure), which may be coupled to the system 102. The system 102 may communicate with the external repository through the interface(s) 114 to obtain information from the data 120.

As mentioned before, the system 102 is configured to manage data logs for different entities to allow efficient storage of data logs and their purging mechanism. Data logs may be provided by the client devices 104 from time to time due to various different reasons. Certain data logs might be stored after every pre-determined time period to store the state of different client devices and applications. However, other data logs may be stored in critical situations, such as fault in any client device; or an unexpected error in any application. Such data logs may also include error data logs which store the different criteria during which the error occurred, such as the possible reasons of the error, the state of the device when the error occurred, and the time stamps to show when the error occurred. In one implementation of the present subject matter, all data logs provided by the client devices 104 are stored by the system 102 in the database 108.

For efficient storage of the data logs, in one implementation of the present subject matter, the partitioning module 122 of the system 102 is configured to partition the storage space of the database 108 among different entities. Each entity may either be a single client device 104, or may be a combination of multiple client devices 104. Further, each entity may either include one application or may include a group of applications. In said implementation, the partitioning module 122 may partition the database 108 based on certain partitioning parameters which may define the storage space requirement of different entities. That is, the amount of storage space required by each entity may be defined by the partitioning parameters associated with each of the entities. In one implementation, the requirement of each of the entity may be based on one or more of, the criticality associated with each entity, the size of data logs generated by the entity, and the frequency in which the data logs are generated by the entity. Therefore, based on these criteria, the partitioning parameter for each entity may be determined and associated with the entity.

In one implementation, the partitioning module 122, may partition the database 108 into multiple partitions based on the partitioning parameter associated with each of the entities. The partitioning parameters associated with the entities may be received by the partitioning module 122 to determine the storage space for each entity. That is, the partitioning module 122 may allocate a separate storage space to each entity in the database 108 based on the partitioning parameter associated with each of the entities. For example, the partitioning module 122 may partition the storage space of the database 108 into 5 different entities. Each entity may have an associated partitioning parameter associated with it. Based on the associated partitioning parameter with each of the entities, the partitioning module 122 may partition the database 108 such that the first entity is allocated a 20% share of the available storage space, the second entity is allocated a 50% share of the available storage space, and the remaining entities are allocated a share of 10% each.

It would be understood that the entire storage space of the database 108 may not be utilized by the system 102 for the purpose of storing data logs and accordingly, only the storage space utilized for the purpose of data logs storage may be partitioned by the partitioning module 122 among the different entities.

The partitioning of the storage space of the database 108 into different partitions for different entities may allow the system 102 to apply different techniques of data logs management to the different partitions based on specific requirements of the entities.

In one implementation of the present subject matter, the fragmentation module 124 of the system 102 is configured to fragment the data logs generated by the entities into smaller size data logs for efficient storage on the allocated partition. The fragmentation of data logs may either be done for all the data logs stored onto the database 108, or may be based on the specific requirement of individual entities. In said implementation, the fragmentation of the data logs may be based on the size of the storage space allocated to each entity and the size of data logs generated by each entity. For example, the fragmentation module 124 may determine to fragment the data logs of three entities out five for which the data logs generated are of size greater than a pre-determined size.

Further, it may also happen that the entities may define and provide input to the fragmentation module 124 to fragment data logs generated by them. In such scenarios, the fragmentation module 124 may partition the data logs for the entities which have provided any inputs related to the fragmentation. In one implementation, the entities may provide inputs to the fragmentation module 124 in the form of fragmentation parameters. The fragmentation parameters may include, a size to which the data logs are to be fragmented, any threshold size of data logs beyond which the fragmentation should occur, and alike based on which the fragmentation of the data logs may be performed by the fragmentation module 124.

In one implementation, the fragmentation module 124 is configured to fragment the data logs based on the partition size allocated to an entity and the number of data logs generated by the entity. In said implementation, the fragmentation module 124 may determine the size of fragmented data logs based on the ratio of the partition size and the number of data logs. In other words, the size of the fragmented data log can be represented as:

$$\text{Size of Fragmented Data Log} = \frac{\text{Size of Partiton}}{\text{Number of Data logs Generated}} \quad (1)$$

Based on the above define relation (1), it would be understood that the fragmentation module 124 may fragment the data logs for different entities in different sizes to store the data logs efficiently and utilize the storage partition space better.

It would be understood that the data logs stored onto the database 108 are to be purged at regular intervals to relinquish the storage space for storage of fresh data logs. However, purging of important data logs should not be done at the cost of other unimportant data logs. Hence, efficient purging mechanism for purging of not so important data logs prior to the purging of important data logs is utilized by the system 102.

In another implementation of the present subject matter, the purging module 126 is configured to efficiently purge the data logs stored in the storage space of the database 108. The purging module 126 is configured to purge data logs of different partitions in different ways, based on the entities of each partition. In one implementation, the purging of data logs in a partition may be based on the requirement of the entities. Such as, one entity may store sensitive data logs at any particular given time instance, every day, say a banking application that stores data logs of every branch between 11:00 am to 12:00 noon. The data logs stored during this time instance every day are important to the organization and may require storage space in the partition allocated to this entity such that no data log is missed. In such a scenario, the purging module 126 may determine to purge the older data logs stored in the partition allocated to this entity prior to 11:00 am daily to ensure available storage space. It would be understood that the data logs may be purged for other partitions at different time instances, other than 11:00 am.

Few, other entities may store data logs after every pre-defined time period to store state of the applications and client device 104. However, in situations of error and failure of applications, the data logs may be stored by the entity with a sudden impulse. In other words, many data logs may be generated and stored within a short span of time during such un-expected error or failure. Therefore, for different entities, a pre-defined time duration and a threshold of data logs may defined based on which it may be determined whether a the data logs have been stored with a sudden impulse or not. For example, if for an entity, the pre-defined time duration is 5 minutes and, the threshold of data logs is 50, in situations where more than 50 data logs are stored within a span of 5 minutes, the data logs may be marked as data logs being stored with a sudden impulse. Further, since such data logs might also be important for further analysis and fault findings, in one implementation the purging module 126 may determine to purge data logs which have been stored at normal intervals prior to data logs that have been stored in a short span of time with a sudden impulse.

In another implementation, the purging module 126 may purge data logs based on critical point associated with data logs of different entities. As described before, different data logs may have different criticality based on the importance associated with them. That is, different data logs may store information that may have varied relative importance with respect to the entities storing such data logs. Therefore, the criticality point associated with different data logs may be different. The purging module 126 may associate a criticality point with data logs based on the relevance, for example, the data logs with less importance, such as the normal data logs generated and stored after every predetermined time period may be associated with a low criticality point. Similarly, the data logs associated with high importance, such as the error data logs, may be associated with a high criticality point. In said implementation, the purging module 126 may determine to purge the data logs with low criticality point, prior to the data logs of high criticality point; to relinquish storage space in the partition of the entity.

In one implementation, the purging module 126 may also purge the data logs from a partition allocated to an entity, based on the requirement of an entity which may be defined according to purging parameters. Each entity may define the purging parameters to define the time of purging data logs, frequency of purging data logs, criticality point of data logs to be purged first, and time instances during when data logs stored should be or not be purged. Therefore, based on the requirement of different entities, data logs purging mechanism can be implemented by the system 102 independently, on various partitions.

According to an implementation of the present subject matter, the overwriting module 128 of the system 102 is configured to manage the storage space of the database 108 such that the data logs stored by each entity in their respective partition can also be stored in other partitions during exhaustion of storage space in the allocated partition, In said implementation, the overwriting module 128 may determine unused storage space in partitions of other entities to store data logs of any entity whose storage space is near exhaustion. For example, the database 108 may be partitioned by the partitioning module 122 among 10 entities and only 10% of available storage space is allocated to the 8$^{th}$ entity. Further, the 8$^{th}$ entity be such which at instances, stores large number of data logs in a very short span of time. In such a scenario, if the 10% storage space of the 8$^{th}$ entity is exhausted during an event of storing large number of data logs, the overwriting module 128 may utilize the unused storage space of 3$^{rd}$ entity to store such data logs.

In another implementation, the overwriting module 128 may store data logs of one entity onto storage partition of another entity based on overwriting factors associated with each partition. Based on the overwriting factors, the entities may define that for what type of data logs, the overwriting onto partition of other entity's storage space may be performed, by the overwriting module 128. In other words, an entity may define to store data for only certain type of data logs generated by itself, to be stored onto another entity's partition. For example, in the above mentioned scenario of 10 entities, the 8$^{th}$ entity may define that only error data logs may be stored onto partition of another entity and other data logs be rejected in situation of exhaustion of storage space.

Similarly, another entity may define that only data logs with high criticality point may be stored onto the partition of other entity may be carried by the overwriting module 128. In said implementation, each entity may also independently define the maximum size of their partition to be utilized by the overwriting module 128 for the purpose of storing data logs of other entities.

In one implementation, based on the overwriting factors, some entities may also define to not share their partition for storage of data logs from other entities in spite of available storage space. Therefore, it would be understood that the entities may also define, by the way of the overwriting factors, the management of data logs with respect to overwriting of data logs. In one implementation, the overwriting factor may include parameters such as, storage space available, criticality of the data logs, and sharing capability of the partition to define the requirement of different entities. It would be understood that different entities may define different parameters in different manner to suite their requirement and needs.

Yet in another implementation of the present subject matter, the partitioning module 122 of the system 102 is configured to dynamically modify the partitioning of the already partitioned database 108. Such dynamic partitioning may be based on changing requirements of the entities that may depend on the number of data logs and the size of data logs generated. For example, in situations where the total available space with the database 108 is 30 GB and the partitioning module 122 has partitioned the database 108 among 3 applications in shares of 30%, 20%, and 50%, respectively, requirement of any one entity, say entity 3, may increase suddenly, due to storage failure of an application and storage of error data logs. In such a situation, the partitioning module 122 may dynamically modify the share of the entities to 20%, 10%, and 70%, respectively to provide more storage space to the third entity.

FIG. 2 illustrates method 200 for data logs management in a multi-client architecture, according to an embodiment of the present subject matter. The order in which the method 200 is described is not intended to be construed as a limitation, and any number of the described method blocks can be combined in any order to implement the method 200, or any alternative methods. Additionally, individual blocks may be deleted from the method without departing from the spirit and scope of the subject matter described herein. Furthermore, the method can be implemented in any suitable hardware, software, firmware, or combination thereof.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication devices configured to perform said steps of the exemplary methods.

Referring to FIG. 2, at block 202, storage space for data logs is partitioned into multiple partitions to allocate among a plurality of entities, where each entity among the plurality of entities is allocated at least one partition. In one implementation, a data logs management system, such as the system 102 may be utilized to partition the storage space. In said implementation, the partitioning module 122 of the system 102 may partition the storage space available for storage of data logs into multiple partitions. In another implementation, the portioning of storage space may be based on requirement of the plurality of entities.

At block 204, purging parameters associated with each entity are identified from amongst the plurality of entities, where the purging parameters at least include frequency of purging, as a criterion of purging data logs to relinquish storage space. The purging parameters may define criteria based on which purging of data logs in a partition may occur. For example, an entity may define the frequency of purging to be three times a day while another entity may define the frequency to be once a day. Similarly, the purging parameters may also include time of purging data logs that may be defined by entities, the criticality point of data logs to be purged first associated with the entities, and time instances during when data logs stored should be or not be purged.

At block 206, data logs stored in the partitions of the plurality of entities are purged based on purging parameters associated each entity from amongst the plurality of entities. In one implementation, the data logs that are purged may include the fragmented data logs and, the non-fragmented data logs stored in the partitions of the storage space. The purging of data logs may be based on the individual requirement of entities. For example, an entity from amongst the plurality of entities may require purging of normal data logs prior to the purging or error data logs. Similarly, another entity may require purging of data logs twice in 12 hours as compared to normal purging of data logs of other entities once every 12 hours.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

We claim:

1. A method, performed by one or more processors, for data logs management, comprising:
    partitioning a database into a plurality of partitions to store data logs, wherein the plurality of partitions are allocated among a plurality of entities, and wherein each entity from amongst the plurality of entities is allocated at least one partition from amongst the plurality of partitions; and
    identifying purging parameters associated with an entity from amongst the plurality of entities, wherein the purging parameters comprise at least criticality point associated with the data logs, wherein the purging parameters signify criteria of purging data logs stored by the entity in the database, wherein important data logs are associated with a high criticality point when a threshold number is exceeded, and wherein normal data logs are associated with a low criticality point when the threshold number is not exceeded;
    wherein the data logs are generated within a pre-defined time duration; and
    the method further comprises:
    purging the data logs based on the purging parameters;
    identifying fragmentation parameters associated with each entity from amongst the plurality of entities, wherein the fragmentation parameters define a fragmentation criteria of data logs into different sizes; and
    fragmenting the data logs generated by each of the entities from amongst the plurality of entities to different sizes based on the identified fragmentation parameters;
    wherein:
    the partitioning is based on partitioning parameters associated with each entity of the plurality of entities; and
    the partitioning parameters define the size of partition allocated to each entity of the plurality of the entities.

2. The method as claimed in claim 1, wherein the different sizes of the data logs fragmented for each entity is based on storage size of the database allocated to the entity and number of the data logs generated by the entity.

3. The method as claimed in claim 1, wherein the purging parameters further comprise frequency of purging and time instances based on which the stored data logs are purged.

4. The method as claimed in claim 1, wherein the purging of the data logs is further based on a pre-defined time duration and a threshold number of data logs stored in the partition, wherein the pre-defined time duration and the threshold of data logs are indicative of the data logs that are stored with an impulse.

5. The method as claimed in claim 1, wherein the method further comprises:
    identifying overwriting factors associated with each entity from amongst the plurality of entities, wherein the overwriting factors define overwriting criteria of data logs from one partition to another; and
    overwriting the data logs of the entity onto an unused partition of another entity based on the overwriting factors.

6. The method as claimed in claim 5, wherein the overwriting factors associated with each entity comprise at least one of storage space available, criticality of the data logs, and sharing capability of entities' partition.

7. The method as claimed in claim 1, wherein the method further comprises dynamically partitioning the storage space among the plurality of entities based on changing requirement of storage space of the plurality of entities.

8. The method as claimed in claim 1, further comprising fragmenting the data logs generated by each of the entities from amongst the plurality of entities to different sizes based on the partition size allocated to an entity of the plurality of entities divided by a number of data logs generated by the entity.

9. The method as claimed in claim 1, wherein a partitioning parameter of the partitioning parameters is determined from a size of a data log generated by an entity of the plurality of entities.

10. The method as claimed in claim 1, wherein a partitioning parameter of the partitioning parameters is determined from a frequency that data logs are generated by an entity of the plurality of entities.

11. A system for data logs management comprising:
    a processor;
    a partitioning module configured to partition a database into a plurality of partitions to store data logs, wherein:
    the plurality of partitions are allocated among the plurality of entities;

each entity from amongst the plurality of entities is allocated at least one partition from amongst the plurality of partitions;

the partitioning is based on partitioning parameters associated with each entity of the plurality of entities; and the partitioning parameters define the size of partition allocated to each entity of the plurality of the entities; and a purging module coupled to the processor, configured to:

identify purging parameters associated with an entity from amongst the plurality of entities, wherein the purging parameters comprise at least criticality point associated with the data logs, wherein the purging parameters signify criteria of purging data logs stored by the entity in the database, wherein important data logs are associated with a high criticality point if a threshold number is exceeded, wherein normal data logs are associated with a low criticality point if the threshold number is not exceeded, and wherein the data logs are generated within a pre-defined time duration; and purge the data logs based on the purging parameters;

wherein the system further comprises a fragmentation module configured to:

identify fragmentation parameters associated with each entity from amongst the plurality of entities, wherein the fragmentation parameters define a fragmentation criteria of data logs into different sizes; and fragment the data logs generated by each of the entity from amongst the plurality of entities to different sizes based on the identified fragmentation parameters.

12. The system as claimed in claim 11, wherein the system further comprises a overwriting module configured to:

identify overwriting factors associated with each entity from amongst the plurality of entities, wherein the overwriting factors define overwriting criteria of data logs from one partition to another; and overwrite the data logs of the entity onto partition of another entity based on the overwriting factors, wherein the partition of another entity is unused.

13. The system as claimed in claim 11, wherein the partitioning module is further configured to dynamically partition the storage space among the plurality of entities based on changing requirement of storage space of the plurality of entities.

14. A non-transitory computer-readable medium having embodied thereon a computer readable program code for executing a method comprising:

partitioning a database into a plurality of partitions to store data logs, wherein the plurality of partitions are allocated among a plurality of entities, and wherein each entity from amongst the plurality of entities is allocated at least one partition from amongst the plurality of partitions;

identifying purging parameters associated with an entity from amongst the plurality of entities, wherein the purging parameters comprise at least criticality point associated with the data logs, wherein the purging parameters signify criteria of purging data logs stored by the entity in the database, wherein important data logs are associated with a high criticality point if a threshold number is exceeded, and wherein normal data logs are associated with a low criticality point if the threshold number is not exceeded;

wherein the data logs are generated within a pre-defined time duration; and the method further comprises:

purging the data logs based on the purging parameters;

identifying fragmentation parameters associated with each entity from amongst the plurality of entities, wherein the fragmentation parameters define a fragmentation criteria of data logs into different sizes; and fragmenting the data logs generated by each of the entity from amongst the plurality of entities to different sizes based on the identified fragmentation parameters;

wherein:

the partitioning is based on partitioning parameters associated with each of the plurality of entities; and the partitioning parameters define the size of partition allocated to each of the plurality of the entities.

* * * * *